(12) United States Patent
Brewer

(10) Patent No.: US 11,418,455 B2
(45) Date of Patent: Aug. 16, 2022

(54) TRANSPARENT PACKET SPLITTING AND RECOMBINING

(71) Applicant: Micron Technology, Inc., Boise, ID (US)

(72) Inventor: Tony Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 39 days.

(21) Appl. No.: 17/007,492

(22) Filed: Aug. 31, 2020

(65) Prior Publication Data

US 2022/0070105 A1  Mar. 3, 2022

(51) Int. Cl.
  *H04L 12/801*  (2013.01)
  *H04L 47/34*  (2022.01)
  *H04L 45/74*  (2022.01)

(52) U.S. Cl.
  CPC .............. *H04L 47/34* (2013.01); *H04L 45/74* (2013.01)

(58) Field of Classification Search
  CPC . H04L 29/06; H04L 2012/5624; H04L 69/03; H04L 69/14; H04L 69/326; H04L 49/9057; H04L 69/166; H04L 49/9084; H04L 47/34; H04L 47/36; H04L 12/2861; H04L 12/56; H04L 29/08; H04L 12/861; H04L 12/801; H04Q 11/0478; H04Q 11/04; H04J 3/24

(Continued)

(56) References Cited

U.S. PATENT DOCUMENTS 6,650,660 B1 * 11/2003 Koehler .................. H04L 29/06
                                                    370/510
7,477,637 B2 *  1/2009 Koehler .................. H04L 29/06
                                                    370/476
(Continued)

FOREIGN PATENT DOCUMENTS

WO  WO-2017196143 A1  11/2017
WO  WO-2019178813 A1   9/2019
(Continued)

OTHER PUBLICATIONS

"International Application Serial No. PCT/US2021/038657, International Search Report dated Oct. 5, 2021", 3 pgs.
(Continued)

*Primary Examiner* — Man U Phan
(74) *Attorney, Agent, or Firm* — Schwegman Lundberg & Woessner, P.A.

(57) ABSTRACT

A transmitting device generates multiple small packets for a large packet and transmits them to a receiving device. Routing devices forward the multiple small packets to the receiving device. Each of the smaller packets, except the last packet, has a sequence indicator set. As a result, the receiving device is able to determine that each of the smaller packets is part of a larger packet and buffer the smaller packets or their payloads. When the last packet is received, the larger packet is complete and may be processed by the receiving device. The routing devices delay requests from other transmitting devices to transmit data to the receiving device until the last packet is sent to the receiving device. The routing devices may continue to route traffic to the receiving device on all virtual channels other than a virtual channel being used for the large packet.

20 Claims, 8 Drawing Sheets

(58) Field of Classification Search
USPC .......................................................... 370/235
See application file for complete search history.

(56) References Cited

U.S. PATENT DOCUMENTS

| | | | |
|---|---|---|---|
| 7,613,209 B1 | 11/2009 | Nguyen et al. | |
| 9,495,194 B1* | 11/2016 | Twitchell, Jr. | .......... H04L 67/24 |
| 9,800,514 B1 | 10/2017 | Chen et al. | |
| 9,946,462 B1 | 4/2018 | Li et al. | |
| 10,216,537 B2* | 2/2019 | Twitchell, Jr. | .......... H04L 67/14 |
| 11,075,647 B2* | 7/2021 | Rigo | .................. H03M 7/6023 |
| 2005/0251612 A1 | 11/2005 | Creta et al. | |
| 2008/0232364 A1 | 9/2008 | Beverly | |
| 2008/0310427 A1* | 12/2008 | West | ..................... H04L 9/3215 |
| | | | 370/400 |
| 2009/0261996 A1 | 10/2009 | Itoh | |
| 2010/0153658 A1 | 6/2010 | Duncan et al. | |
| 2011/0072177 A1 | 3/2011 | Glasco et al. | |
| 2011/0078222 A1* | 3/2011 | Wegener | ............. H03M 7/3059 |
| | | | 708/203 |
| 2012/0159037 A1 | 6/2012 | Kwon et al. | |
| 2013/0028261 A1 | 1/2013 | Lee | |
| 2013/0051385 A1 | 2/2013 | Jayasimha et al. | |
| 2013/0103783 A1 | 4/2013 | Mannava et al. | |
| 2013/0142066 A1 | 6/2013 | Yamaguchi et al. | |
| 2014/0010364 A1 | 1/2014 | Shibutani et al. | |
| 2014/0365632 A1 | 12/2014 | Ishii et al. | |
| 2014/0369355 A1 | 12/2014 | Hori | |
| 2015/0010005 A1 | 1/2015 | Yoshida et al. | |
| 2015/0052283 A1 | 2/2015 | Ishii et al. | |
| 2015/0109024 A1* | 4/2015 | Abdelfattah | ... H03K 19/017581 |
| | | | 326/41 |
| 2015/0242261 A1 | 8/2015 | Yamaguchi et al. | |
| 2016/0255048 A1 | 9/2016 | Ganesh et al. | |
| 2017/0064544 A1 | 3/2017 | Youn et al. | |
| 2017/0310473 A1* | 10/2017 | Takiguchi | ................ H04L 9/085 |
| 2017/0322841 A1 | 11/2017 | Morris et al. | |
| 2018/0011759 A1 | 1/2018 | Willey et al. | |
| 2018/0097722 A1 | 4/2018 | Callard | |
| 2018/0307597 A1 | 10/2018 | Oh et al. | |
| 2019/0171604 A1 | 6/2019 | Brewer | |
| 2019/0243700 A1* | 8/2019 | Brewer | ................ G11C 7/1045 |
| 2019/0324928 A1 | 10/2019 | Brewer | |
| 2019/0332555 A1 | 10/2019 | Mcvay | |
| 2019/0340019 A1 | 11/2019 | Brewer | |
| 2019/0340020 A1 | 11/2019 | Brewer | |
| 2019/0340023 A1 | 11/2019 | Brewer | |
| 2019/0340024 A1 | 11/2019 | Brewer | |
| 2019/0340027 A1 | 11/2019 | Brewer | |
| 2019/0340035 A1 | 11/2019 | Brewer | |
| 2019/0340154 A1 | 11/2019 | Brewer | |
| 2019/0340155 A1 | 11/2019 | Brewer | |
| 2020/0151137 A1 | 5/2020 | Izenberg et al. | |
| 2020/0162191 A1* | 5/2020 | Yu | ......................... H04L 1/0041 |
| 2020/0274552 A1 | 8/2020 | Rigo et al. | |
| 2021/0014179 A1* | 1/2021 | Luo | ..................... H04L 49/9084 |
| 2021/0142448 A1 | 5/2021 | Yao et al. | |
| 2021/0297354 A1* | 9/2021 | Zemach | .................. H04L 47/30 |
| 2022/0066969 A1 | 3/2022 | Patrick et al. | |
| 2022/0070096 A1 | 3/2022 | Brewer | |
| 2022/0070106 A1 | 3/2022 | Brewer | |
| 2022/0070284 A1 | 3/2022 | Patrick et al. | |

FOREIGN PATENT DOCUMENTS

| | | |
|---|---|---|
| WO | WO-2022046260 A1 | 3/2022 |
| WO | WO-2022046261 A1 | 3/2022 |
| WO | WO-2022046262 A1 | 3/2022 |
| WO | WO-2022046263 A1 | 3/2022 |
| WO | WO-2022046264 A1 | 3/2022 |

OTHER PUBLICATIONS

"International Application Serial No. PCT/US2021/038657, Written Opinion dated Oct. 5, 2021", 4 pgs.
"International Application Serial No. PCT/US2021/038669, International Search Report dated Oct. 5, 2021", 4 pgs.
"International Application Serial No. PCT/US2021/038669, Written Opinion dated Oct. 5, 2021", 5 pgs.
"International Application Serial No. PCT/US2021/038683, International Search Report dated Oct. 5, 2021", 3 pgs.
"International Application Serial No. PCT/US2021/038683, Written Opinion dated Oct. 5, 2021", 6 pgs.
"International Application Serial No. PCT/US2021/038689, International Search Report dated Oct. 14, 2021", 3 pgs.
"International Application Serial No. PCT/US2021/038689, Written Opinion dated Oct. 14, 2021", 5 pgs.
"International Application Serial No. PCT/US2021/038698, International Search Report dated Oct. 1, 2021", 3 pgs.
"International Application Serial No. PCT/US2021/038698, Written Opinion dated Oct. 1, 2021", 5 pgs.
"WikiChip Fuse", (Jan. 4, 2020), 9 pgs.

* cited by examiner

TRANSPARENT PACKET SPLITTING AND RECOMBINING

STATEMENT REGARDING GOVERNMENT SUPPORT

This invention was made with U.S. Government support under Agreement No. HR00111830003, awarded by DARPA. The Government has certain rights in the invention.

TECHNICAL FIELD

Embodiments of the disclosure relate generally to network protocols and more specifically to networking using a method to transparent transfer large packets through a network using smaller packets.

BACKGROUND

Packets are sent through a network and individually routed to their destinations. If multiple packets are related, a receiving device processes the multiple packets as needed. Data structures larger than individual packets are not handled by the network.

Chiplets are an emerging technique for integrating various processing functionality. Generally, a chiplet system is made up of discrete chips (e.g., integrated circuits (ICs) on different substrate or die) that are integrated on an interposer and packaged together. This arrangement is distinct from single chips (e.g., ICs) that contain distinct device blocks (e.g., intellectual property blocks) on one substrate (e.g., single die), such as a system-on-a-chip (SoC), or discretely packaged devices integrated on a board. In general, chiplets provide better performance (e.g., lower power consumption, reduced latency, etc.) than discretely packaged devices, and chiplets provide greater production benefits than single die chips. These production benefits can include higher yields or reduced development costs and time.

Chiplet systems are generally made up of one or more application chiplets and support chiplets. Here, the distinction between application and support chiplets is simply a reference to the likely design scenarios for the chiplet system. Thus, for example, a synthetic vision chiplet system can include an application chiplet to produce the synthetic vision output along with support chiplets, such as a memory controller chiplet, sensor interface chiplet, or communication chiplet. In a typical use case, the synthetic vision designer can design the application chiplet and source the support chiplets from other parties. Thus, the design expenditure (e.g., in terms of time or complexity) is reduced by avoiding the design and production of functionality embodied in the support chiplets. Chiplets also support the tight integration of intellectual property blocks that can otherwise be difficult, such as those using different feature sizes. Thus, for example, devices designed during a previous fabrication generation with larger feature sizes, or those devices in which the feature size is optimized for the power, speed, or heat generation—as can happen with sensors—can be integrated with devices having different feature sizes more easily than attempting to do so on a single die. Additionally, by reducing the overall size of the die, the yield for chiplets tends to be higher than that of more complex, single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
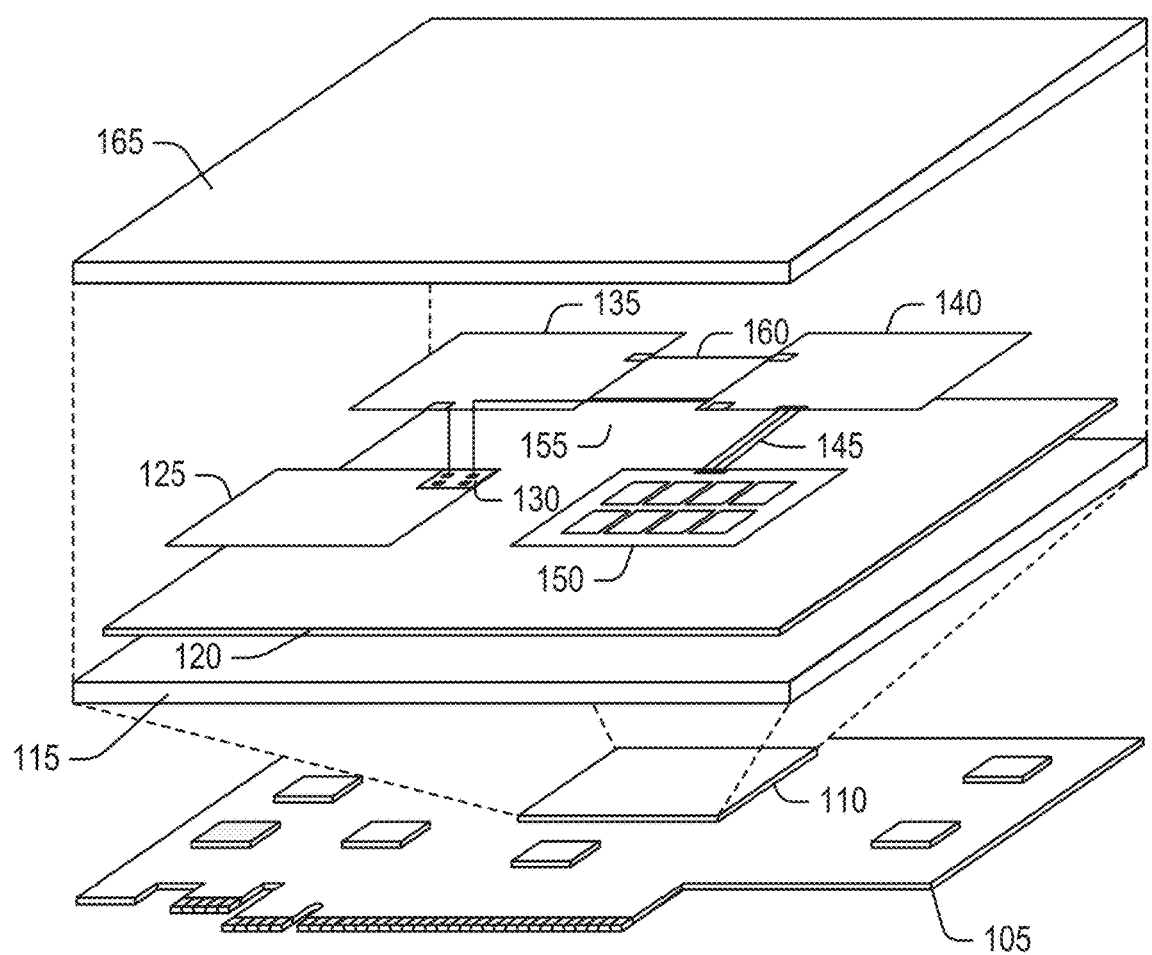
FIGS. 1A and 1B illustrate an example of a chiplet system, according to an embodiment.

Implementations of the present disclosure are directed to systems and methods for transparently splitting large packets for transmission over a network using multiple smaller packets. The transmitting device determines that a large packet for a receiving device will be split into multiple smaller packets. For example, the large packet may exceed the maximum size of the network protocol. The transmitting device generates multiple small packets for the large packet and transmits them to the receiving device. Zero or more routing devices along a path from the transmitting device to the receiving device forward the multiple small packets to the receiving device, which reassembles them.

Each of the smaller packets, except the last packet, has a sequence indicator set. The last packet has the sequence indicator cleared. As a result, the routing devices and the receiving device are able to determine that each of the smaller packets are part of a larger packet and buffer the smaller packets or their payloads. When the last packet is received, the larger packet is complete and may be processed by the receiving device.

The routing devices on the path from the transmitting device to the destination device recognize that transmission of a large packet is in progress. Accordingly, requests from other transmitting devices to transmit data to the receiving device are delayed until the last packet with the cleared sequence indicator is sent to the receiving device. In this way, the receiving device will not receive an unrelated packet while buffering the large packet. In some example embodiments, the handling of the sequence indicator is on a per virtual channel per receiving device basis instead of only on a per receiving device basis. In these embodiments, the routing devices continue to route traffic to the receiving device on all virtual channels other than the virtual channel being used for the large packet.

Among the benefits of implementations of the present disclosure is that large packets of a first network protocol may be transparently transmitted across a network using a second network protocol that uses smaller packets without increasing the buffer memory of receiving devices. Compared to solutions that allow transmission of data to the receiving device while the receiving device is buffering a large packet (or that allow transmission of data using the virtual channel of the receiving device while the receiving device is buffering a large packet being received using the virtual channel), buffer memory is reduced, decreasing fabrication cost, increasing fabrication yield, decreasing the physical size of the receiving component, or any suitable combination thereof. Processing cycles expended in transferring, receiving, and processing data packets are reduced. Additionally, power consumed in performing the processing is reduced. Performance of the system comprising the communicating devices is also improved as a result of the reduced networking overhead. Other benefits will be evident to those of skill in the relevant art having the benefit of this disclosure.

Such efficiency in reducing such processing cycles can be of particular benefit in a chiplet system including a memory controller, as such systems offer modular capabilities that can, in some embodiments, be configured for enabling relatively high performance memory operations, as may be required, for example, for systems performing a large number of, and/or relatively high complexity, computations. Allowing the memory controller to receive large packets over a network using a protocol with a smaller maximum packet size enables other devices already configured to use large packets to benefit from use of the memory controller without reconfiguration.

For example, various forms of navigation-directed systems may need to coordinate data from multiple sensors essentially simultaneously to perform the navigation function. An example use for such a chiplet system implementing a memory system including a memory controller with one or more forms of memory would be a self-driving vehicle in which data from various ranging sensors such as radar, lidar, and/or ultrasonic sensors, may be correlated with data from multiple optical sensors (potentially requiring image processing and pattern identification), gyroscopes, skid sensors, and the like.

Figure 1B:
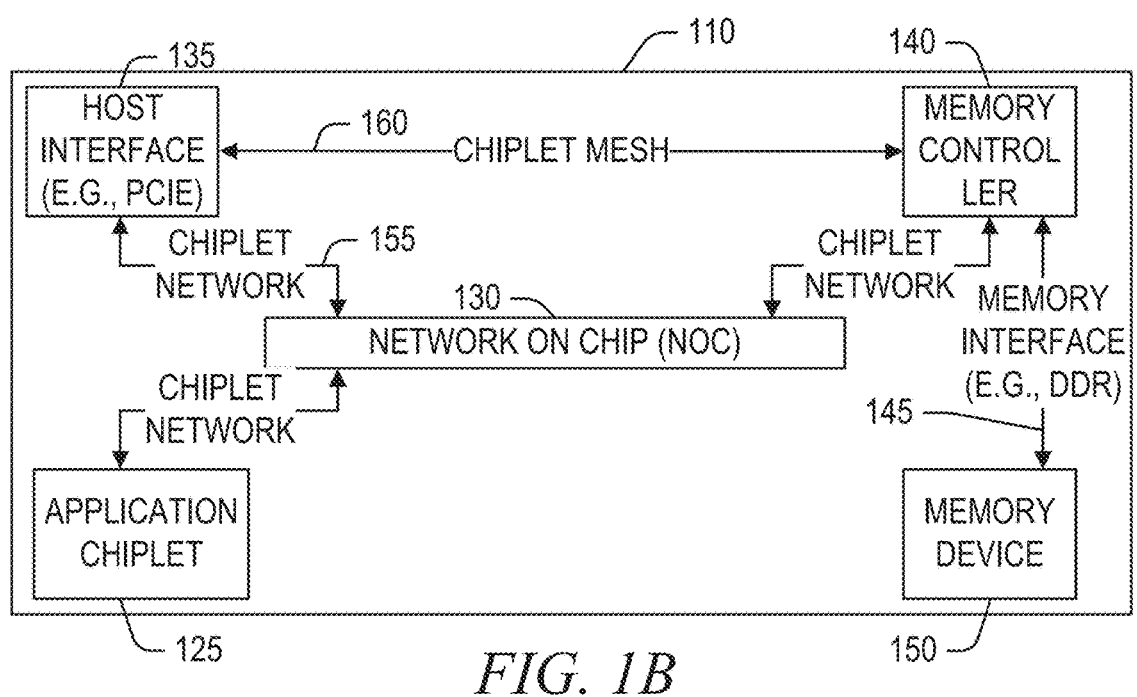

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets: an application chiplet 125, a host interface chiplet 135, a memory controller chiplet 140, and a memory device chiplet 150. Other systems may include many additional chiplets to provide additional functionalities, as will be apparent from the following discussion. The package of the chiplet system 110 is illustrated with a lid or cover 165, though other packaging techniques and structures for the chiplet system 110 can be used. FIG. 1B is a block diagram labeling the components in the chiplet system 110 for clarity.

The application chiplet 125 is illustrated as including a network-on-chip (NOC) 130 to support a chiplet network 155 for inter-chiplet communications. In example embodiments, NOC 130 may be included on the application chiplet 125. In an example, NOC 130 may be defined in response to selected support chiplets (e.g., chiplets 135, 140, and 150), thus enabling a designer to select an appropriate number of chiplet network connections or switches for the NOC 130. In an example, the NOC 130 can be located on a separate chiplet or even within the interposer 120. In examples as discussed herein, the NOC 130 implements a CPI network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, and so forth. Within a single chip, these options are generally selected to meet design goals, such as power consumption, speed, and so forth. However, to achieve the flexibility of the chiplet system 110, an adapter, such as CPI, is used to interface between the various AXI design options that can be implemented in the various chiplets. By enabling a physical channel for virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections or drivers to increase the voltage, or otherwise facilitate transmitting the signals over longer distances. An example of one such physical layer can include the Advanced Interface Bus (AIB), which, in various examples, can be implemented in the interposer 120. AIB transmits and receives data using source-synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit (TX) and receive (RX) signals. The channel can be configured to have a symmetrical number of TX and RX input/outputs (I/Os), or have a non-symmetrical number of transmitters and receivers (e.g., either all transmitters or all receivers). The chiplet providing the primary clock is the primary chiplet; the other chiplet is the secondary chiplet. In such scenarios, a primary may have independence from other chiplets, and it may have supervisory authority over one or more secondary chiplets. Such a relationship may be similar to the relationship between devices sometimes described using the derogatory and antiquated terms master and slave. AIB I/O cells support three clocking modes: asynchronous (i.e., non-clocked), SDR, and DDR. Other physical layers may support any or all of these clocking modes, or additional clocking modes. In various examples, the non-clocked mode is used for clocks and some control signals. The SDR mode can use dedicated SDR only I/O cells or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e., 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary (AUX) channel. The AUX channel contains signals used for AIB initialization. All AIB channels (other than the AUX channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally. CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block-level cyclic redundancy checking (CRC)), link-level retry, or forward error correction. However, when low latency or energy consumption is a primary concern for ultra-short-reach chiplet-to-chiplet interconnects, a parallel interface with clock rates that allow data transfer with minimal latency may be utilized. CPI includes elements to reduce both latency and energy consumption in these ultra-short-reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender to allow transmitting of additional information.

Also illustrated is a chiplet mesh network 160 that uses a direct, chiplet-to-chiplet technique without the need for the NOC 130. The chiplet mesh network 160 can be implemented in CPI or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry-standard memory interfaces 145 (such as, for example, synchronous memory interfaces, such as DDR5, DDR 6), can also be used to interconnect chiplets. Connection of a chiplet system or individual chiplets to external devices (such as a larger system) can be through a desired interface (for example, a PCIE interface). Such an external interface may be implemented, in an example, through a host interface chiplet 135, which in the depicted example provides a PCIE interface external to chiplet system 110. Such dedicated memory interfaces 145 are generally employed when a convention or standard in the industry has converged on such an interface. The illustrated example of a DDR interface as the memory interface 145 connecting the memory controller chiplet 140 to a dynamic random access memory (DRAM) memory device chiplet 150 is just such an industry convention.

Of the variety of possible support chiplets, the memory controller chiplet 140 is likely present in the chiplet system 110 due to the near omnipresent use of storage for computer processing as well as being sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device-specific interface to read, write, or erase data. Often, the memory controller chiplet 140 can provide additional features, such as error detection, error correction, maintenance operations, or atomic operation execution. For some types of memory, maintenance operations tend to be specific to the memory device chiplet 150, such as garbage collection in negative-and (NAND) flash or storage class memories and temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh, may be controlled by a host processor or a memory controller at some times, and at other times be controlled by the DRAM memory device or by logic associated with one or more DRAM devices, such as an interface chip (in an example, a buffer).

Atomic operations are a data manipulation that, for example, may be performed by the memory controller chiplet 140. In other chiplet systems, the atomic operations may be performed by other chiplets. For example, an atomic operation of "increment" can be specified in a command by the application chiplet 125, with the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the command's success to the application chiplet 125. Atomic operations avoid transmitting the data across the chiplet mesh network 160, resulting in lower latency execution of such commands.

Atomic operations can be classified as built-in atomics or programmable (e.g., custom) atomics. Built-in atomics are a finite set of operations that are immutably implemented in hardware. Programmable atomics are small programs that can run on a programmable atomic unit (PAU) (e.g., a custom atomic unit (CAU)) of the memory controller chiplet 140. FIGS. 1A and 1B illustrate an example of a memory controller chiplet that comprises a PAU.

The memory device chiplet 150 can be, or include any combination of, volatile memory devices or non-volatile memories. Examples of volatile memory devices include, but are not limited to, random access memory (RAM)—such as DRAM) synchronous DRAM (SDRAM), and graphics double data rate type 6 SDRAM (GDDR6 SDRAM), among others. Examples of non-volatile memory devices include, but are not limited to, NAND-type flash memory, storage class memory (e.g., phase-change memory or memristor based technologies), and ferroelectric RAM (FeRAM), among others. The illustrated example includes the memory device as the memory device chiplet 150; however, the memory device can reside elsewhere, such as in a different package on the board 105. For many applications, multiple memory device chiplets may be provided. In an example, these memory device chiplets may each implement one or multiple storage technologies. In an example, a memory chiplet may include multiple stacked memory die of different technologies (for example, one or more SRAM devices stacked or otherwise in communication with one or more DRAM devices). Memory controller chiplet 140 may also serve to coordinate operations between multiple memory chiplets in chiplet system 110 (for example, to utilize one or more memory chiplets in one or more levels of cache storage and to use one or more additional memory chiplets as main memory). Chiplet system 110 may also include multiple memory controller chiplets 140, as may be used to provide memory control functionality for separate processors, sensors, networks, and so forth. A chiplet architecture, such as chiplet system 110, offers benefits in allowing adaptation to different memory storage technologies and different memory interfaces, through updated chiplet configurations, without requiring redesign of the remainder of the system structure.

Figure 2:
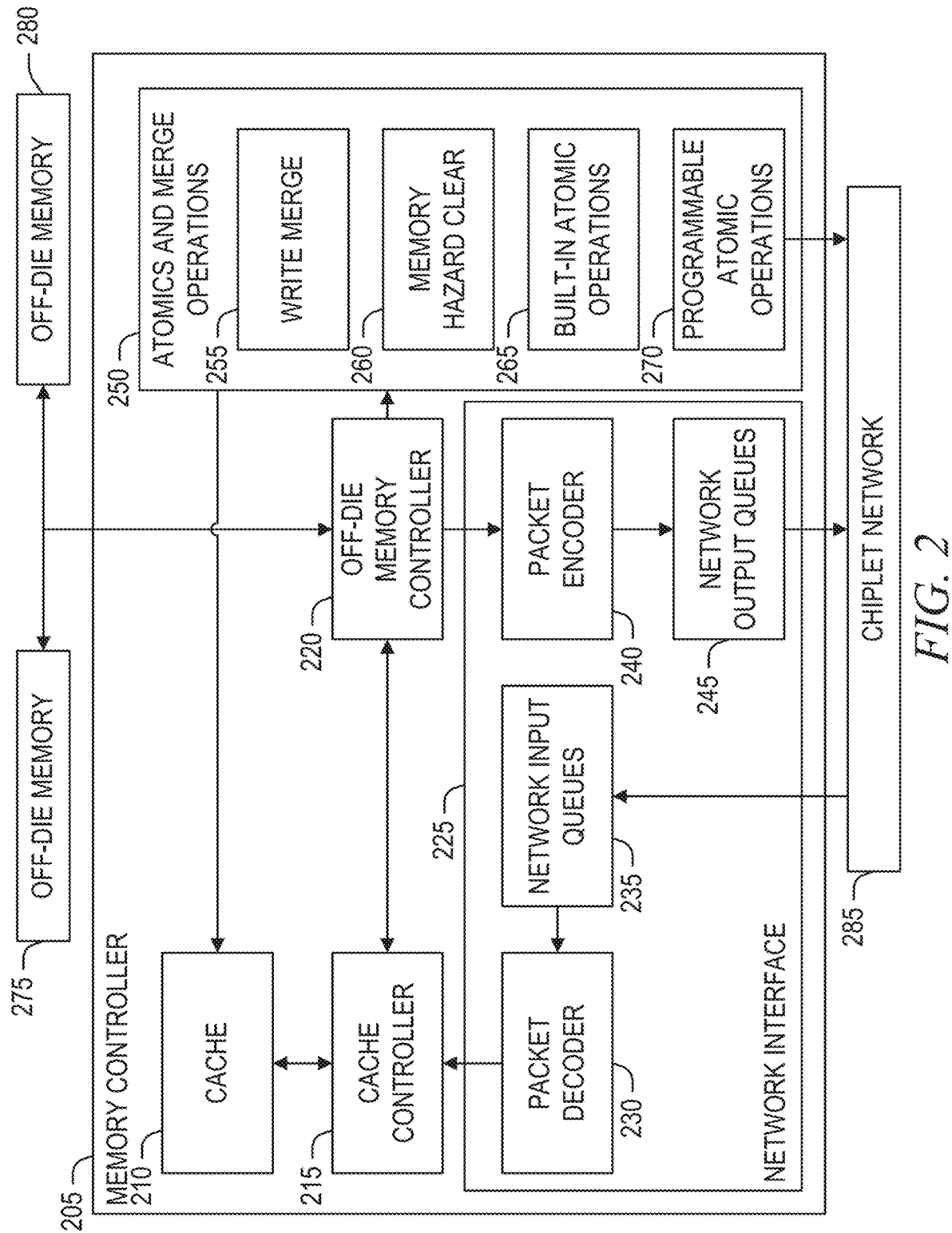
FIG. 2 illustrates components of an example of a memory controller chiplet, according to an embodiment.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 275), a network communication interface 225 (e.g., to interface with a chiplet network 285 and communicate with other chiplets), and a set of atomics and merge operations units 250. Members of this set can include, for example, a write merge unit 255, a memory hazard clear unit 260, built-in atomic operations unit 265, or a PAU 270. The various components are illustrated logically and not as they necessarily would be implemented. For example, the built-in atomic operations unit 265 likely comprises different devices along a path to the off-die memory 275 and/or 280. For example, the built-in atomic operations unit 265 could be in an interface device/buffer on a memory chiplet, as discussed above. In contrast, the PAU 270 are likely implemented in a separate processor on the memory controller chiplet 205 (but in various examples may be implemented in other locations, for example on a memory chiplet).

The off-die memory controller 220 is directly coupled to an off-die memory 275 (e.g., via a bus or other communication connection) to provide write operations and read operations to and from the one or more off-die memory, such as off-die memory 275 and off-die memory 280. In the depicted example, the off-die memory controller 220 is also coupled for output to the atomics and merge operations units 250 and for input to the cache controller 215 (e.g., a memory-side cache controller).

In the example configuration, cache controller 215 is directly coupled to the cache 210, and may be coupled to the network communication interface 225 for input (such as incoming read or write requests) and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration or a mesh network providing for additional connections, depending upon the configuration.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 210 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomics and merge operations units 250, or both. As noted above, one or more levels of cache may also be implemented in off-die memories 275 or 280, and in some such examples may be accessed directly by cache controller 215. Data read by the off-die memory controller 220 can be cached in the cache 210 by the cache controller 215 for later use.

The atomics and merge operations units 250 are coupled to receive (as input) the output of the off-die memory controller 220, and to provide output to the cache 210, the network communication interface 225, or directly to the chiplet network 285. The memory hazard clear (reset) unit 260, write merge unit 255, and the built-in (e.g., predetermined) atomic operations unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry and various state machines with other combinational logic circuitry or other logic circuitry, and can also include one or more registers, buffers, or memories to store addresses, executable instructions, operand and other data, or can be implemented as a processor.

The write merge unit 255 receives read data and request data and merges the request data and read data to create a single unit having the read data and the source address to be used in the response or return data packet. The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 285.

When the request data is for a built-in atomic operation, the built-in atomic operations unit 265 receives the request and reads data, either from the write merge unit 255 or directly from the off-die memory controller 220. The atomic operation is performed, and using the write merge unit 255, the resulting data is written to the cache 210, or provided to the network communication interface 225 to encode and prepare a response or return data packet for transmission on the chiplet network 285.

The built-in atomic operations unit 265 handles predefined atomic operations such as fetch-and-increment or compare-and-swap. In an example, these operations perform a simple read-modify-write operation to a single memory location of 32-bytes or less in size. Atomic memory operations are initiated from a request packet transmitted over the chiplet network 285. The request packet has a physical address, atomic operator type, operand size, and, optionally, up to 32 bytes of data. The atomic operation performs the read-modify-write to a cache memory line of the cache 210, filling the cache memory if necessary. The atomic operator response can be a simple completion response or a response with up to 32 bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operations can also involve requests for a "standard" atomic operation on the requested data, such as comparatively simple, single cycle, integer atomics, such as fetch-and-increment or compare-and-swap, which will occur with the same throughput as a regular memory read or write operation not involving an atomic operation. For these operations, the cache controller 215 may generally reserve a cache line in the cache 210 by setting a hazard bit (in hardware), so that the cache line cannot be read by another process while it is in transition. The data is obtained from either the off-die memory 275 or the cache 210, and is provided to the built-in atomic operations unit 265 to perform the requested atomic operation. Following the atomic operation, in addition to providing the resulting data to the data packet encoder 240 to encode outgoing data packets for transmission on the chiplet network 285, the built-in atomic operations unit 265 provides the resulting data to the write merge unit 255, which will also write the resulting data to the cache 210. Following the writing of the resulting data to the cache 210, any corresponding hazard bit which was set will be cleared by the memory hazard clear unit 260.

The PAU 270 enables high-performance (high throughput and low latency) for programmable atomic operations (also referred to as "custom atomic operations"), comparable to the performance of built-in atomic operations. Rather than executing multiple memory accesses, in response to an atomic operation request designating a programmable atomic operation and a memory address, circuitry in the memory controller chiplet 205 transfers the atomic operation request to PAU 270 and sets a hazard bit stored in a memory hazard register corresponding to the memory address of the memory line used in the atomic operation to ensure that no other operation (read, write, or atomic) is performed on that memory line, which hazard bit is then cleared upon completion of the atomic operation. Additional direct data paths provided for the PAU 270 executing the programmable atomic operations allow for additional write operations without any limitations imposed by the bandwidth of the communication networks and without increasing any congestion of the communication networks.

The PAU 270 includes a multi-threaded processor, for example, such as a RISC-V ISA-based multi-threaded processor, having one or more processor cores, and further having an extended instruction set for executing programmable atomic operations. When provided with the extended instruction set for executing programmable atomic operations, the PAU 270 can be embodied as one or more hybrid threading processors. In some example embodiments, the PAU 270 provides barrel-style, round-robin instantaneous thread switching to maintain a high instruction-per-clock rate.

Programmable atomic operations can be performed by the PAU 270 involving requests for a programmable atomic operation on the requested data. A user can prepare programming code to provide such programmable atomic operations. For example, the programmable atomic operations can be comparatively simple, multi-cycle operations such as floating-point addition, or comparatively complex, multi-instruction operations such as a Bloom filter insert. The programmable atomic operations can be the same as or different than the predetermined atomic operations, insofar as they are defined by the user rather than a system vendor. For these operations, the cache controller 215 can reserve a cache line in the cache 210 by setting a hazard bit (in hardware), so that cache line cannot be read by another process while it is in transition. The data is obtained from either the cache 210 or the off-die memories 275 or 280, and is provided to the PAU 270 to perform the requested programmable atomic operation. Following the atomic operation, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache controller 215.

In selected examples, the approach taken for programmable atomic operations is to provide multiple custom atomic request types that can be sent through the chiplet network 285 to the memory controller chiplet 205 from an originating source such as a processor or other system component. The cache controllers 215 or off-die memory controller 220 identify the request as a custom atomic and forward the request to the PAU 270. In a representative embodiment, the PAU 270: (1) is a programmable processing element capable of efficiently performing a user defined atomic operation; (2) can perform load and stores to memory, arithmetic and logical operations, and control flow decisions; and (3) leverages the RISC-V ISA with a set of new, specialized instructions to facilitate interacting with such controllers 215, 220 to atomically perform the user-defined operation. In desirable examples, the RISC-V ISA contains a full set of instructions that support high-level language operators and data types. The PAU 270 can leverage the RISC-V ISA but will commonly support a more limited set of instructions and limited register file size to reduce the die size of the unit when included within the memory controller chiplet 205.

As mentioned above, prior to the writing of the read data to the cache 210, the set hazard bit for the reserved cache line is to be cleared by the memory hazard clear unit 260. Accordingly, when the request and read data is received by the write merge unit 255, a reset or clear signal can be transmitted by the memory hazard clear unit 260 to the cache 210 to reset the set memory hazard bit for the reserved cache line. Also, resetting this hazard bit will release a pending read or write request involving the designated (or reserved) cache line, providing the pending read or write request to an inbound request multiplexer for selection and processing.

Figure 3:
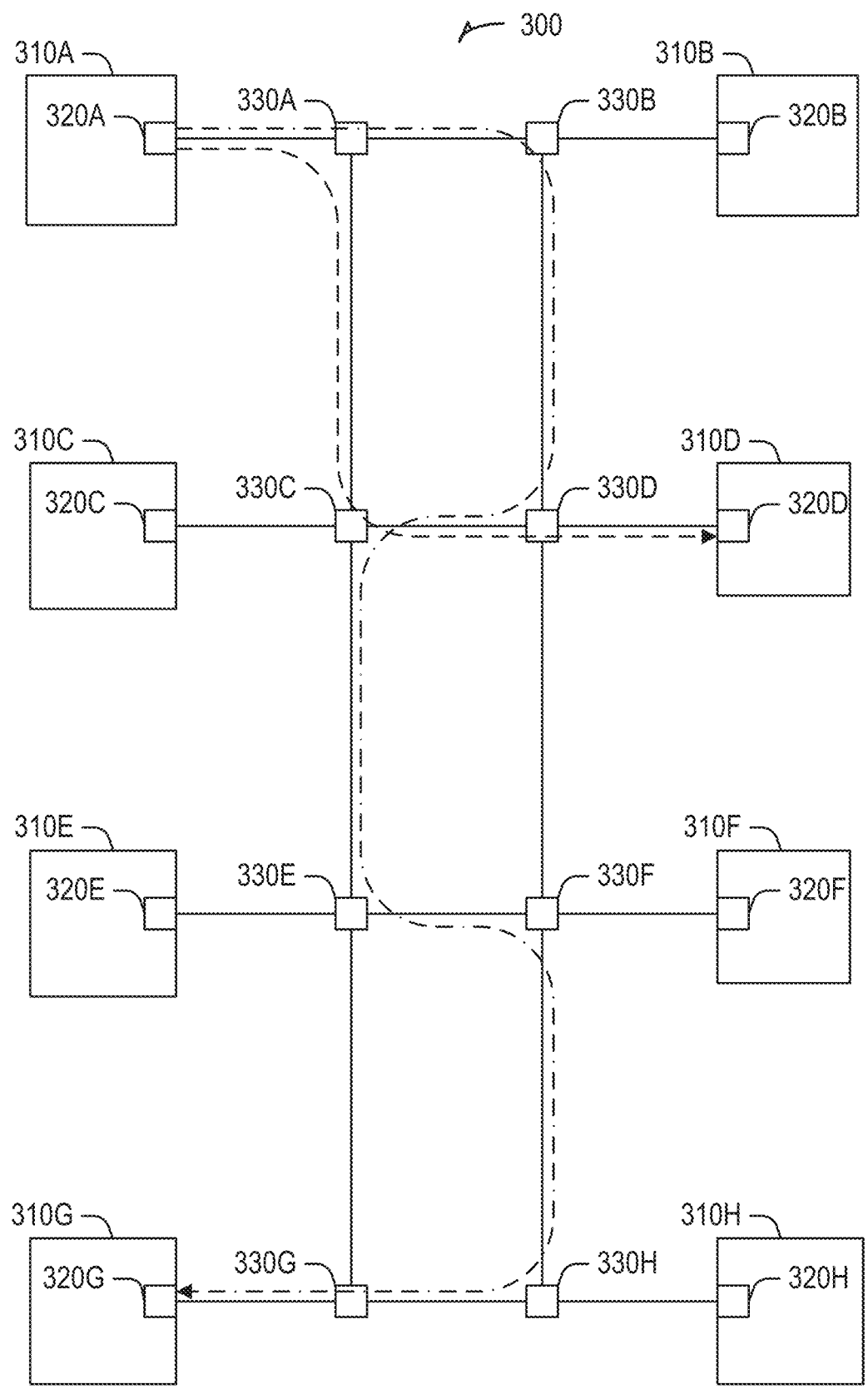
FIG. 3 illustrates an example of routing between chiplets using a chiplet protocol interface (CPI) network, according to an embodiment.

FIG. 3 illustrates an example of routing between chiplets in a chiplet layout 300 using a CPI network, according to an embodiment. The chiplet layout 300 includes chiplets 310A, 310B, 310C, 310D, 310E, 310F, 310G, and 310H. The chiplets 310A-310H are interconnected by a network comprising nodes 330A, 330B, 330C, 330D, 330E, 330F, 330G, and 330H. Each of the chiplets 310A-310H includes a hardware transceiver, labeled 320A-320H. The network nodes 330A-330H also include one or more hardware transceivers, allowing receipt and transmission of flits through the network. In some example embodiments, the network nodes 330A-330H are implemented as chiplets, which may provide additional functionality.

CPI packets can be transferred between the chiplets 310 using an AIB. The AIB provides physical layer functionality. The physical layer transmits and receives data using source-synchronous data transfers with a forwarded clock. Packets are transferred across the AIB at SDR or DDR with respect to the transmitted clock. Various channel widths are supported by the AIB. AIB channel widths are in multiples of 20 bits when operated in SDR mode (20, 40, 60 . . . ), and 40 bits for DDR mode (40, 80, 120 . . . ). The AIB channel width includes both TX and RX signals. The channel may be configured to have a symmetrical number of TX and RX I/Os or have a non-symmetrical number of transmitters and receivers (e.g., either all transmitters or all receivers). The channel may act as an AIB primary or secondary depending on which chiplet provides the primary clock.

The AIB adapter provides an interface to the AIB link layer and an interface to the AIB physical layer (PHY). The AIB adapter provides data staging registers, power-on reset sequencers, and a control signal shift register.

The AIB physical layer consists of AIB I/O cells. AIB I/O cells (implemented, in some example embodiments, by the hardware transceivers 320) may be input only, output only, or bidirectional. An AIB channel is composed of a set of AIB I/O cells and the number of cells is dependent on the configuration of the AIB channel. The receive signals on one chiplet are connected to the transmit signals on the paired chiplet. In some example embodiments, each column comprises an AUX channel and data channels numbered 0 to N.

AIB channels are typically configured as half TX data plus half RX data, all TX data, or all RX data plus associated clocks and miscellaneous control. The number of TX versus RX data signals is determined at design time and cannot be configured as part of system initialization, in some example embodiments.

The CPI packet protocols (point-to-point and routable) use symmetrical receive and transmit I/O cells within an AIB channel. The CPI streaming protocol allows more flexible use of the AR I/O cells. An AIB channel for streaming mode may configure the I/O cells as all TX, all RX, or half TX and half RX, in some example embodiments.

Data packets are routed among the chiplets 310 by the network nodes 330. A node 330 may determine the next node 330 to forward a received data packet to based on one or more data fields of the data packet. For example, a source or destination address, source or destination port, virtual channel, or any suitable combination thereof may be hashed to select a successive network node or an available network path. Selecting paths in this way may serve to balance network traffic.

Thus, in FIG. 3, a data path is shown from the chiplet 310A to the chiplet 310D. The data packet is sent by the hardware transceiver 320A to the network node 330A; forwarded by the network node 330A to the network node 330C; forwarded by the network node 330C to the network node 330D; and delivered by the network node 330D to the hardware transceiver 320D of the chiplet 310D.

A second data path is also shown in FIG. 3, from the chiplet 310A to the chiplet 310G. The data packet is sent by the hardware transceiver 320A to the network node 330A; forwarded by the network node 330A to the network node 330B; forwarded by the network node 330B to the network node 330D; forwarded by the network node 330D to the network node 330C; forwarded by the network node 330C to the network node 330E; forwarded by the network node 330E to the network node 330F; forwarded by the network node 330F to the network node 330H: forwarded by the network node 330H to the network node 330G; and delivered by the network node 330G to the hardware transceiver 320G of the chiplet 310G. As is visually apparent in FIG. 3, multiple paths through the network are available for transmission of data between any pair of chiplets.

AIB I/O cells support three clocking modes: asynchronous (i.e., non-clocked), SDR, and DDR. The non-clocked mode is used for clocks and some control signals. The SDR mode may use dedicated SDR only I/O cells or dual use SDR/DDR I/O cells.

CPI packet protocols (point-to-point and routable) may use an AIB channel in either SDR or DDR operation modes. In some example embodiments, the AIB channel is in increments of 80 I/O cells (i.e., 40 TX and 40 RX) for SDR mode and 40 I/O cells for DDR mode.

CPI streaming protocol may use an AIB channel in either SDR or DDR operation modes. In some example embodiments, for both modes (SDR and DDR), the AIB channel is in increments of 40 I/O cells.

Each AIB channel is assigned a unique interface identifier. The identifier is used during CPI reset and initialization to determine paired AIB channels across adjacent chiplets. In some example embodiments, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

In some example embodiments, AIB channels are numbered in continuous increasing order starting with the AIB channel adjacent to the AUX channel. The AIB channel adjacent to the AUX is defined to be AIB channel zero.

FIG. 3, by way of example, shows eight chiplets 310 connected by a network comprising eight nodes 330. More or fewer chiplets 310 and more or fewer nodes 330 may be included in the chiplet network, allowing a network of chiplets of arbitrary size to be created.

Figure 4:
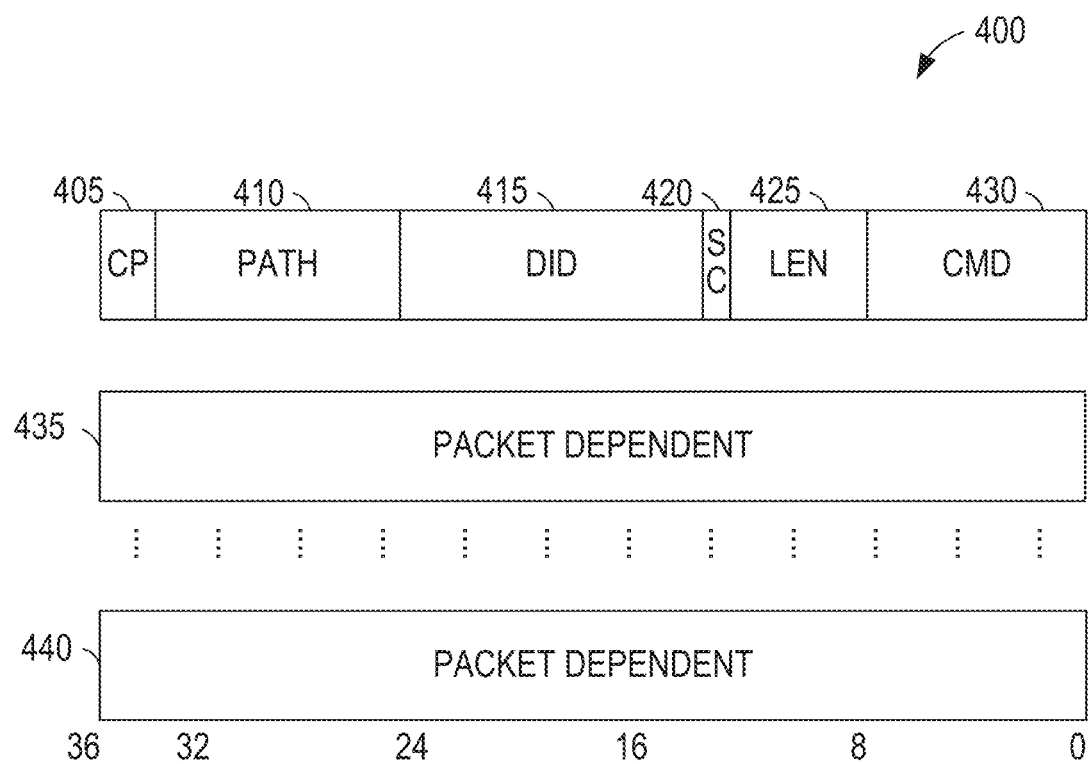
FIG. 4 is a block diagram of a data packet comprising multiple flits, in accordance with some embodiments of the present disclosure.

FIG. 4 is a block diagram of a data packet 400 comprising multiple flits, in accordance with some embodiments of the present disclosure. The data packet 400 is divided into flow control units (flits), each of which is composed of 36 bits. The first flit of the data packet 400 includes control path field 405, path field 410, destination identifier (DID) field 415, sequence continue (SC) field 420, length field 425, and command field 430. The second flit 435 and last flit 440 contain packet-dependent data. The data packet 400 includes a total number of flits indicated by the length field 425, and thus may not include one or both of the second flit 435 and the last flit 440 (e.g., if only one or two flits are included in the packet) or may include one or more additional flits between the second flit 435 and the last flit 440.

The control path field 405 is a two-bit field that indicates whether the path field 410 should be used to control ordering of packets. In some example embodiments, a value of 0 indicates that the path field 410 is ignored, a value of 1 or 3 indicates that the path field 410 is used to determine the path for the data packet 400, and a value of 2 indicates that single path ordering is to be used. In some example embodiments a 1-bit field is used.

The path field 410 is an eight-bit field. When the control path field 405 indicates that the path field 410 is used to determine the path for a data packet 400, all data packets having the same value for the path field 410 are guaranteed to take the same path through the network. As a result, the order of the data packets will be unchanged between the sender and the receiver. If the control path field 405 indicates that single path ordering is to be used, the path is determined for each packet as though the path field 410 were set to zero. Accordingly, all packets take the same path and the order will be unchanged, regardless of the actual value of the path field 410 of each data packet. If the control path field 405 indicates that the path field 410 is to be ignored, the data packets are routed without regard to the value of the path field 410 and the data packets may be received by the receiver in a different order than they were sent by the sender. However, this may avoid congestion in the network and allow for greater throughput in the device.

The DID field 415 stores a twelve-bit DID. The DID uniquely identifies a destination in the network (e.g., a destination chiplet). The length field 425 is a five-bit field that indicates the number of flits that comprise the data packet 400. Interpretation of the length field 425 may be non-linear. For example, values 0-22 may be interpreted as 0-22 flits in the data packet 400 and values 23-27 may be interpreted as 33-37 flits in the data packet 400 (i.e., 10 more than the indicated value). Other values of the length field 425 may be vendor defined instead of protocol defined.

A sequence of data packets all having the SC field 420 set are guaranteed to be delivered in order. Additionally, when a routing device detects that the SC field 420 is set in a packet on a virtual channel to a destination from a source, the routing device does not route packets from other sources on the virtual channel to the destination. Once a packet on the virtual channel to the destination from the source that has the SC field 420 cleared is sent to the destination, the routing device resumes routing packets from other sources on the virtual channel to the destination. Routing to other destinations and on other virtual channels of the destination is unaffected.

The command for the data packet 400 is stored in the command field 430, an eight-bit field. The command may be a write command, a read command, a predefined atomic operation command, a custom atomic operation command, a read response, an acknowledge response, or a vendor-specific command. Additionally, the command may indicate a virtual channel of the data packet 400. For example, different commands may be used for different virtual channels or 1, 2, 3, or 4 bits of the eight-bit command field 430 may be used to indicate the virtual channel and the remaining bits may be used to indicate the command. The table below shows the virtual channel based on the protocol and the command, according to some example embodiments.

| Virtual Channel | CPI Protocol | AXI Protocol |
| --- | --- | --- |
| 0 | Read/Write Requests | Write Requests |
| 1 | Read/Write Responses | Write Responses |
| 2 | Unused | Read Requests |
| 3 | Unused | Read Responses |
| 4 | Priority Read/Write Requests | Priority Write Requests |
| 5 | Priority Read/Write Responses | Priority Write Responses |
| 6 | Unused | Priority Read Requests |
| 7 | Unused | Priority Read Responses |

An address for the command may be indicated in the path field 410. The memory access commands may identify a number of bytes to be written or accessed, a memory space to access (e.g., the off-die memory 275 or an instruction memory for custom atomic operations), or any suitable combination thereof. In some example embodiments, the command may indicate that additional bits of a later flit identify the command. For example, a multi-byte command could be sent by using a vendor-specific command in the eight-bit command field 430 and using a portion or all of the second flit 435 to store the multi-byte command. Thus, for certain values of the command field 430, the packet 400 includes only one header flit (e.g., the first header flit shown in FIG. 4, containing fields 405-430). For other values of the command field 430, the packet 400 includes a predetermined additional number of header flits or a predetermined total number of header flits.

Figure 5:
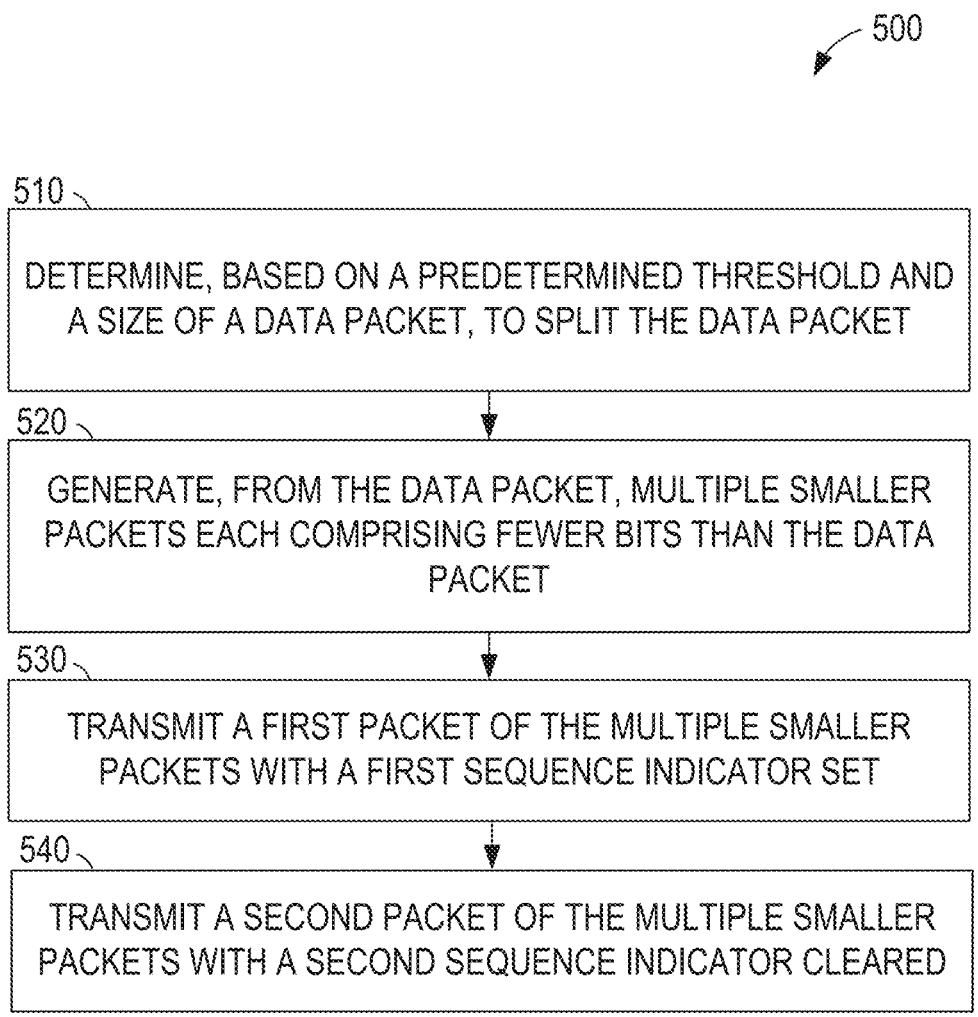
FIG. 5 is a flow chart showing operations of a method performed by a circuit in transparently splitting a packet, in accordance with some embodiments of the present disclosure.

FIG. 5 is a flow chart showing operations of a method 500 performed by a circuit in transparently splitting a packet, in accordance with some embodiments of the present disclosure. The method 500 includes operations 510, 520, 530, and 540. By way of example and not limitation, the method 500 is described as being performed by the devices of FIGS. 1-3, using the data packet of FIG. 4.

In operation 510, a first chiplet (e.g., the chiplet 310A of FIG. 3, implementing the memory controller chiplet 205 of FIG. 2) determines, based on a predetermined threshold (e.g., a maximum packet size supported by the network of FIG. 2) and a size of a data packet, to split the data packet. In some example embodiments, the data packet is of a protocol other than the network protocol (e.g., an AXI packet with a larger maximum payload than the CPI protocol of the network of FIG. 2). Thus, the chiplet 310A or the hardware transceiver 320A may act as a bridge between a first network with a first maximum packet size and a second network with a second maximum packet size.

The first chiplet, in operation 520, generates, from the data packet, multiple smaller packets each comprising fewer bits than the data packet. For example, the data packet may comprise a header and a payload. The header indicates a size of the packet, a source of the packet, and a destination of the packet. Each of the multiple smaller packets may also comprise a header and a payload. The header of each of the multiple smaller packets indicates the size of the smaller packet, the source of the packet, and the destination of the packet, wherein the source and destination of each of the smaller packets is the same as the source and destination of the large packet. Each of the smaller packets includes an indication of a virtual channel (e.g., a virtual channel indicated by the command field 430) that is the same for all of the smaller packets. The total payload size of all of the smaller packets is equal to or greater than the payload size of the data packet, but each smaller packet is smaller than the data packet.

In operation 530, the first chiplet transmits a first packet of the multiple smaller packets with a first sequence indicator set (e.g., the SC field 420 of the first packet). The first chiplet also, in operation 540, transmits a second packet of the multiple smaller packets with a second sequence indicator cleared (e.g., the SC field 420 of the second packet). With respect to operations 530 and 540, the terms "first packet" and "second packet" merely differentiate between the two packets and do not imply that the first and second packets are the sequential first and second packets of the multiple smaller packets. For example, the "first packet" may be the first packet sent and the "second packet" may be the last packet sent. As another example, the "first packet" may be the next-to-last packet sent (out of more than two packets) and the "second packet" may be the last packet sent. Thus, between operations 530 and 540, before operation 530, or both, the first chiplet may send additional packets of the multiple smaller packets. In some example embodiments, operation 520 is completely performed before any of the smaller packets are sent. In other example embodiments, operations 520, 530, and 540 are interleaved, such that each smaller packet is sent as it is generated.

By use of the method 500, the first chiplet is able to transmit the entire payload of a data packet using a network protocol with a maximum payload size smaller than the payload of the data packet. Using the methods 600 and 700, discussed below with respect to FIGS. 6 and 7, the receiving device is enabled to reconstruct the data packet without modification of circuitry or software instructions designed for the data packet. In this way, circuit complexity is reduced, improving the reusability of parts and the efficiency of production, and reducing cost. Additionally, processing cycles, memory consumption, and power used to transmit and receive the data of the data packet are reduced.

Figure 6:
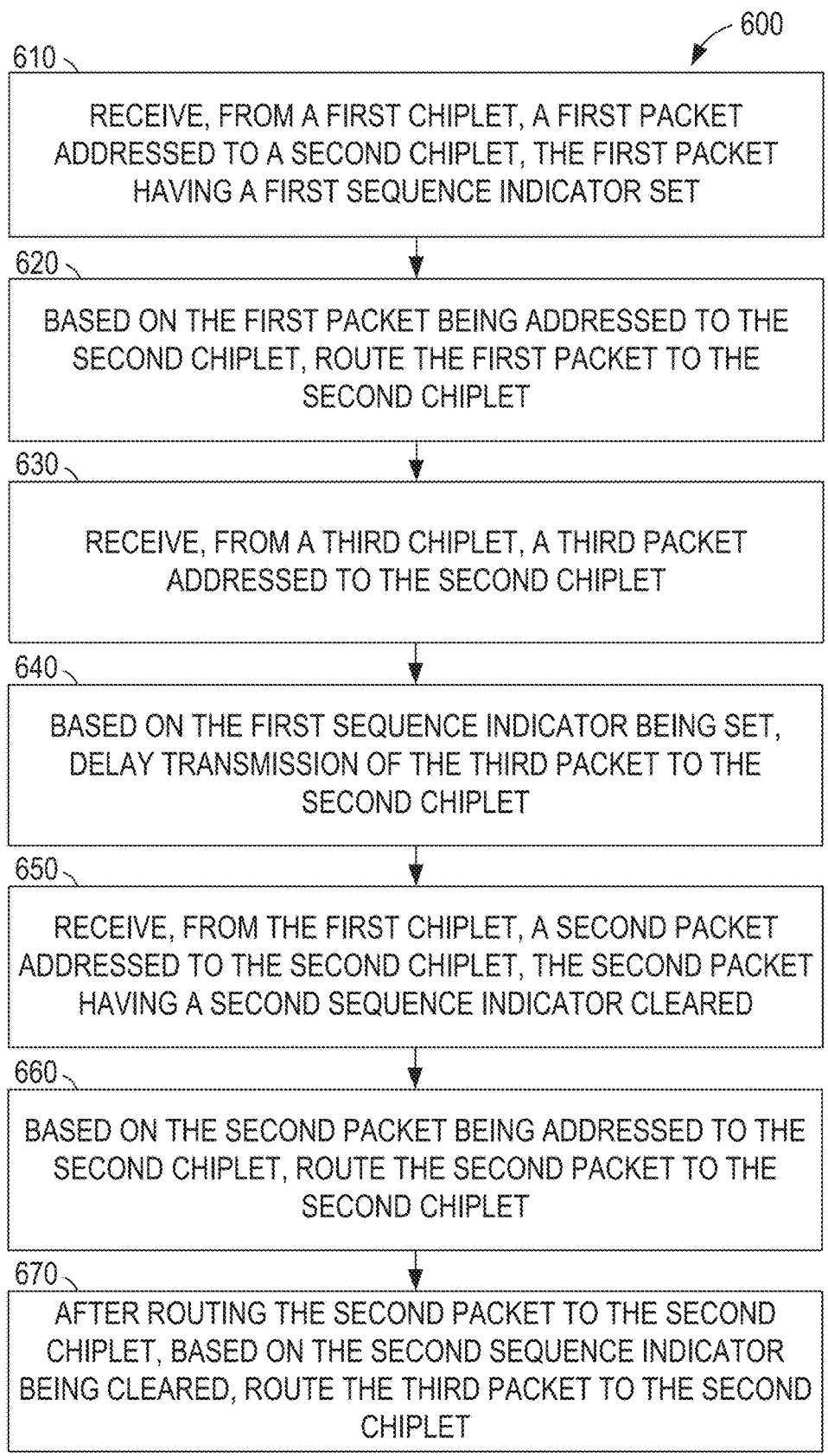
FIG. 6 is a flow chart showing operations of a method performed by a circuit in transparently routing a split packet, in accordance with some embodiments of the present disclosure.

FIG. 6 is a flow chart showing operations of a method 600 performed by a circuit in transparently routing a split packet, in accordance with some embodiments of the present disclosure. The method 600 includes operations 610, 620, 630, 640, 650, 660, and 670. By way of example and not limitation, the method 600 is described as being performed by the devices of FIGS. 1-3, using the data packet of FIG. 4.

In operation 610, a routing device (e.g., the network node 330C of FIG. 3) receives, from a first chiplet (e.g., the chiplet 310A performing the method 500) a first packet addressed to a second chiplet (e.g., the chiplet 310D), the first packet having a first sequence indicator set. As discussed above with respect to the method 500, the SC field 420 indicates that following packets to the same destination (or the same virtual channel of the same destination) are components of a larger packet.

The routing device, in operation 620, based on the first packet being addressed to the second chiplet, routes the first packet to the receiving device. Thus, the first packet is routed normally to the second chiplet. In some example embodiments, a register file or other data structure of the routing device is updated to record an identifier of the transmitting device, an identifier of the receiving device, an identifier of the virtual channel, or any suitable combination thereof.

In operation 630, the routing device receives, from a third chiplet, a third packet addressed to the second chiplet. For example, the chiplet 310C may also send a packet to the chiplet 310D routed through the network node 330C.

The routing device, in operation 640, based on the first sequence indicator being set, delays transmission of the third packet to the second chiplet. By referencing the data structure updated in operation 620, the routing device determines that the second chiplet has been sent a packet having a set sequence identifier, and that the sending device of that packet is different than the sending device of the third packet. Accordingly, transmitting the third packet to the second chiplet would cause the second chiplet to interrupt reception of the larger packet of which the first packet was a component. To avoid this, the routing device either rejects the packet, requesting that the third chiplet attempt to resend the packet, or the routing device caches the packet in local memory storage for later transmission.

In operation 650, the routing device receives, from the first chiplet, a second packet addressed to the second chiplet, the second packet having a second sequence indicator cleared. In the simplest case of the larger packet being split into two smaller packets, the "second packet" of operation 650 is the second packet of the larger packet. However, if the larger packet is split into more than two packets, any number of intervening packets, each with the sequence indicator set, may be received between the first small packet at the last packet. Thus, the "first packet" of operation 610 may be any of the small packets other than the last small packet and the "second packet" of operation 650 is the last small packet of the large packet.

The routing device, in operation 660, based on the second packet being addressed to the second chiplet, routes the second packet to the second chiplet. In some example embodiments, the register file or other data structure of the routing device is updated to clear the relationship between the transmitting device and the receiving device that was recorded in operation 620. Thus, when subsequent packets are received from other transmitting devices, those packets will be routed to the receiving device.

In operation 670, after routing the second packet to the second chiplet, based on the second sequence indicator being cleared, the routing device routes the third packet to the second chiplet. For example, if the third packet was cached at the routing device in operation 640, the third packet is now sent to the second chiplet. As another example, if the third packet was rejected by the routing device in operation 640, the third chiplet resends the third packet to the routing device and the third packet is routed to the second chiplet.

By use of the method 600, the routing device is able to route multiple packets from a first chiplet to a second chiplet without allowing intervening packets to be transmitted to the second chiplet from other chiplets and without interrupting other traffic. For example, in a virtual channel-based system, traffic to other chiplets and traffic to other virtual channels of the second chiplet continues without interruption. In this way, circuit complexity is reduced, improving the reusability of parts and the efficiency of production, and reducing cost. Additionally, processing cycles, memory consumption, and power used to transmit and receive the data of the large packet are reduced.

Figure 7:
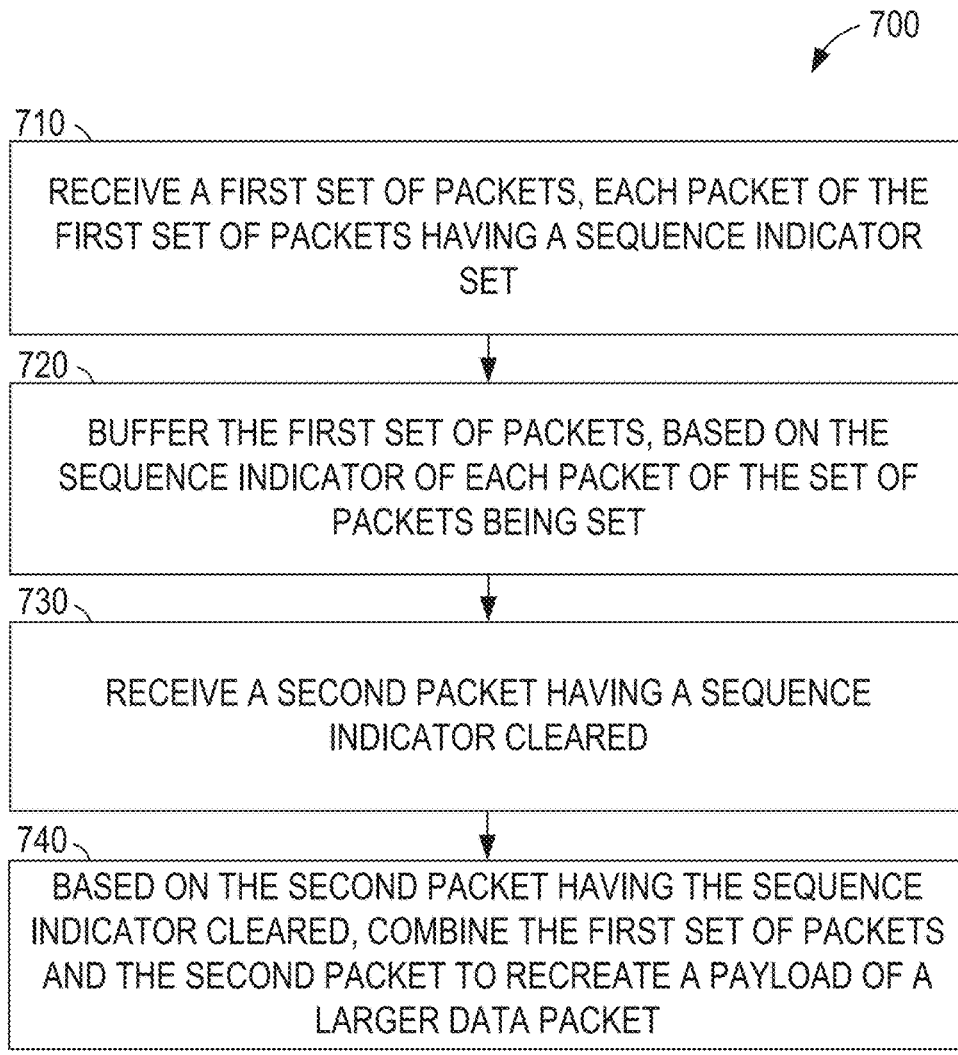
FIG. 7 is a flow chart showing operations of a method performed by a circuit in transparently recombining a split packet, in accordance with some embodiments of the present disclosure.

FIG. 7 is a flow chart showing operations of a method 700 performed by a circuit in transparently recombining a split packet, in accordance with some embodiments of the present disclosure. The method 700 includes operations 710, 720, 730, and 740. By way of example and not limitation, the method 700 is described as being performed by the devices of FIGS. 1-3, using the data packet of FIG. 4.

In operation 710, a receiving device (e.g., the chiplet 310D of FIG. 3) receives a first set of packets, each packet of the first set of packets having a sequence indicator set. For example, a transmitting device performing the method 500 may split a large packet into multiple smaller packets, with each of the multiple smaller packets except the last having a sequence indicator set. The receiving device receives these packets.

The receiving device, in operation 720, buffers the first set of packets based on the sequence indicator of each packet of the set of packets being set. For example, as each packet of the first set of packets is received, the receiving device may check the sequence indicator of the received packet and, if the sequence indicator is set, add the received packet to a buffer. The receiving device may have multiple buffers, one for each virtual channel. In these example embodiments, the buffer for the received packet may be selected based on a virtual channel of the packet (e.g., as indicated by the command field 430 of the packet 400 of FIG. 4 or as indicated by a dedicated virtual channel field of a packet header).

In operation 730, the receiving device receives a second packet having a sequence indicator cleared. Continuing with the example of a transmitting device performing the method 500, the last small packet resulting from splitting a larger packet is transmitted with the sequence indicator cleared. Thus, the "second packet" of operation 730 may be the last small packet of the split large packet transmitted by the transmitting device.

The receiving device, in operation 740, based on the second packet having the sequence indicator cleared, combines the first set of packets and the second packet to recreate a payload of a larger data packet. For example, when a packet with the sequence indicator cleared is received, the contents of the buffer may be checked. If the buffer is empty, the received packet is handled as a single packet of the network protocol (e.g., a CPI packet). If the buffer contains one or more previously received packets with set sequence indicators, the previously received packets and the last received packet with a cleared sequence indicator are combined to recreate the original large packet. In some example embodiments, a header of the original large packet is also recreated. In other example embodiments, only the payload is recreated by discarding the headers of the small packets. The reconstructed packet is provided to a processor or memory storage device of the receiving device.

Thus, by use of the method 700, a receiving device is enabled to receive packets larger than a maximum packet size of a network through which the packets are delivered. In embodiments in which the hardware transceiver reconstructs the large packet, modification to other circuitry is not required. Thus, existing devices that expect large packets transmitted using a first network protocol are enabled to communicate using a second network protocol without modification.

Figure 8:
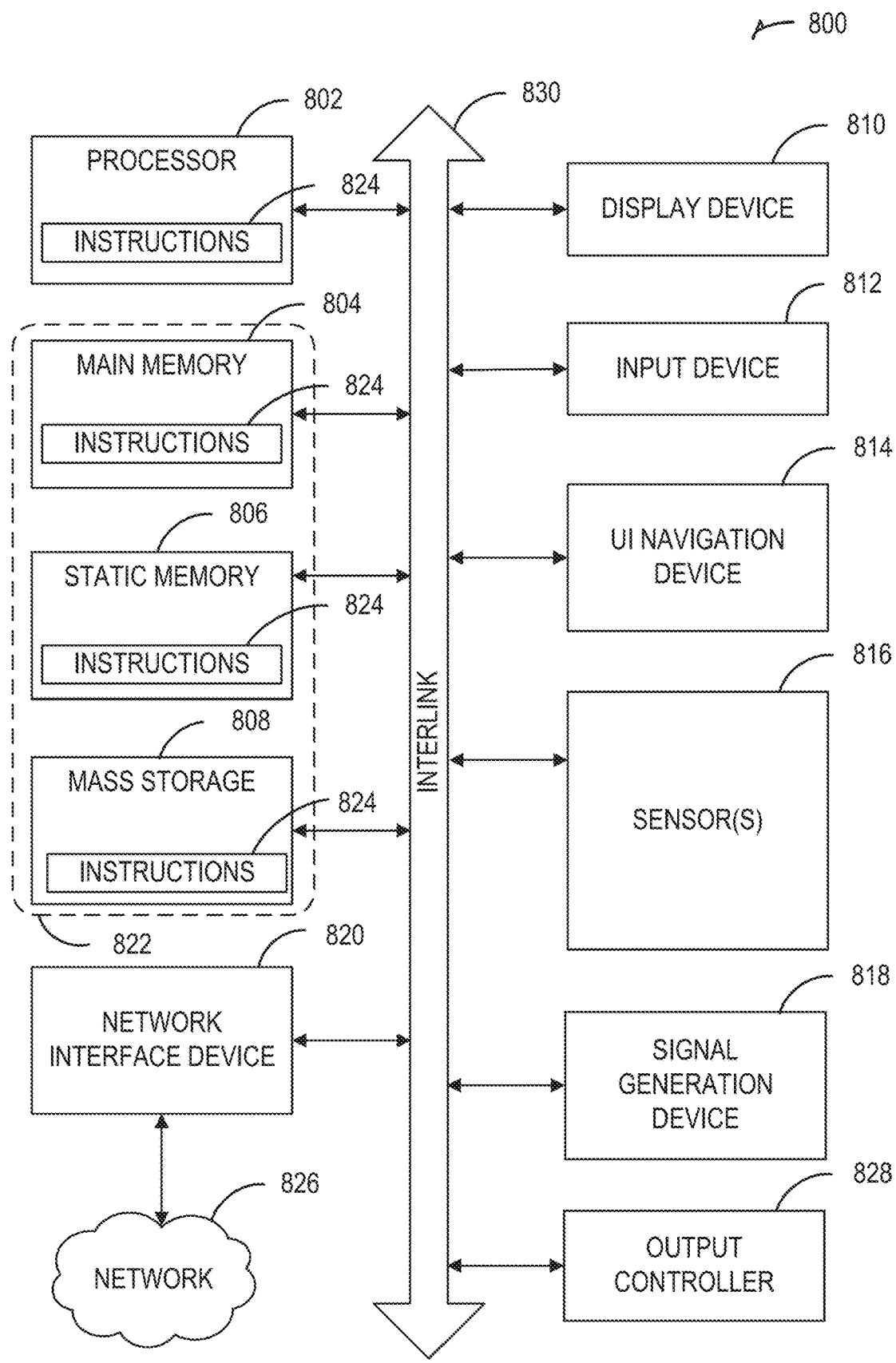
FIG. 8 is a block diagram of an example computer system in which embodiments of the present disclosure may operate.

FIG. 8 illustrates a block diagram of an example machine 800 with which, in which, or by which any one or more of the techniques (e.g., methodologies) discussed herein can be implemented. Examples, as described herein, can include, or can operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 can include a hardware processor 802 (e.g., a central processing unit (CPU), a graphics processing unit (GPU), a hardware processor core, or any combination thereof), a main memory 804, a static memory 806 (e.g., memory or storage for firmware, microcode, a basic-input-output (BIOS), unified extensible firmware interface (UEFI), etc.), and mass storage 808 (e.g., hard drives, tape drives, flash storage, or other block devices), some or all of which can communicate with each other via an interlink (e.g., bus) 830. The machine 800 can further include a display device 810, an alphanumeric input device 812 (e.g., a keyboard), and a user interface (UI) navigation device 814 (e.g., a mouse). In an example, the display device 810, input device 812, and UI navigation device 814 can be a touch screen display. The machine 800 can additionally include a signal generation device 818 (e.g., a speaker), a network interface device 820, and one or more sensors 816, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 can be, or include, a machine-readable medium 822 on which is stored one or more sets of data structures or instructions 824 (e.g., software) embodying or utilized by any one or more of the techniques or functions described herein. The instructions 824 can also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 can constitute the machine-readable media 822. While the machine-readable medium 822 is illustrated as a single medium, the term "machine-readable medium" can include a single medium or multiple media (e.g., a centralized or distributed database, or associated caches and servers) configured to store the one or more instructions 824.

The term "machine-readable medium" can include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine-readable media that do not include transitory propagating signals. Specific examples of non-transitory machine-readable media can include non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and compact disc read only memory (CD-ROM) and digital versatile disc read only memory (DVD-ROM) disks.

In an example, information stored or otherwise provided on the machine-readable medium 822 can be representative of the instructions 824, such as instructions 824 themselves or a format from which the instructions 824 can be derived. This format from which the instructions 824 can be derived can include source code, encoded instructions (e.g., in compressed or encrypted form), packaged instructions (e.g., split into multiple packages), or the like. The information representative of the instructions 824 in the machine-readable medium 822 can be processed by processing circuitry into the instructions to implement any of the operations discussed herein. For example, deriving the instructions 824 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 824.

In an example, the derivation of the instructions 824 can include assembly, compilation, or interpretation of the information (e.g., by the processing circuitry) to create the instructions 824 from some intermediate or preprocessed format provided by the machine-readable medium 822. The information, when provided in multiple parts, can be combined, unpacked, and modified to create the instructions 824. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 824 can be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the communications network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine-readable medium.

In the foregoing specification, some example implementations of the disclosure have been described. It will be evident that various modifications can be made thereto without departing from the broader scope of the disclosure as set forth in the following claims. The specification and drawings are, accordingly, to be regarded in an illustrative sense rather than in a restrictive sense. Below is a non-exhaustive list of examples of implementations of the present disclosure.

Example 1 is a system comprising: a transmitter at a first chiplet; a router coupled to the transmitter via a chiplet network; and a receiver at a second chiplet coupled to the router via the chiplet network, wherein: the first chiplet is configured to perform operations comprising: determining, based on a predetermined threshold and a size of a data packet that is addressed to the second chiplet, to split the data packet; generating, from the data packet, multiple smaller packets each comprising fewer bits than the data packet; transmitting a first packet of the multiple smaller packets with a first sequence indicator set, the first packet being addressed to the second chiplet; and transmitting a second packet of the multiple smaller packets with a second sequence indicator cleared, the second packet being addressed to the second chiplet.

In Example 2, the subject matter of Example 1 includes, wherein the router is configured to perform operations comprising: receiving the first packet; based on the first packet being addressed to the second chiplet, routing the first packet to the second chiplet; receiving a third packet from a third chiplet coupled to the router via the chiplet network, the third packet being addressed to the r second chiplet; based on the first packet being addressed to the second chiplet and having the first sequence indicator set, delaying transmission of the third packet to the second chiplet; receiving the second packet; based on the second packet being addressed to the second chiplet, routing the second packet to the second chiplet; and after routing the second packet to the second chiplet, based on the second packet having the second sequence indicator cleared, routing the third packet to the second chiplet.

In Example 3, the subject matter of Example 2 includes, wherein: the delaying of the transmission of the third packet to the second chiplet is further based on a virtual channel of the first packet being the same as a virtual channel of the third packet.

In Example 4, the subject matter of Examples 2-3 includes, wherein: the routing of the third packet to the second chiplet after routing the second packet to the second chiplet is further based on a virtual channel of the second packet being the same as a virtual channel of the third packet.

In Example 5, the subject matter of Examples 2-4 includes, wherein the router is further configured to perform operations comprising: receiving a fourth packet from a fourth chiplet coupled to the router via the chiplet network, the fourth packet being addressed to the second chiplet; and based on a virtual channel of the first packet being different than a virtual channel of the fourth packet, routing the fourth packet to the second chiplet.

In Example 6, the subject matter of Examples 1-5 includes, wherein the second chiplet is configured to perform operations comprising: receiving the multiple smaller packets; based on the first packet having the first sequence indicator set, buffering the first packet; and based on the second packet having the second sequence indicator cleared, combining the multiple smaller packets to recreate a payload of the data packet.

In Example 7, the subject matter of Examples 1-6 includes, wherein: the transmitting of the first packet with the first sequence indicator set is part of: determining that each packet of a set of packets of the multiple smaller packets is not the last packet of the multiple smaller packets; and transmitting each packet of the set of packets with a sequence indicator set; and the transmitting of the second packet with the second sequence indicator cleared is based on a determination that the second packet is the last packet of the multiple smaller packets.

In Example 8, the subject matter of Examples 1-7 includes, wherein: the second chiplet is a memory controller chiplet.

In Example 9, the subject matter of Example 8 includes, wherein: the memory controller chiplet communicates with at least one memory device chiplet through a memory interface.

Example 10 is a method comprising: determining, by a first chiplet coupled to a router via a chiplet network, based on a predetermined threshold and a size of a data packet that is addressed to a second chiplet coupled to the router via the chiplet network, to split the large packet; generating, by the first chiplet and from the data packet, multiple smaller packets each comprising fewer bits than the data packet; transmitting, by the first chiplet and over the chiplet network, a first packet of the multiple smaller packets with a first sequence indicator set, the first packet being addressed to the second chiplet; and transmitting, by the first chiplet and over the network network, a second packet of the multiple smaller packets with a second sequence indicator cleared, the second packet being addressed to the second chiplet.

In Example 11, the subject matter of Example 10 includes, receiving, by the router, the first packet; based on the first packet being addressed to the second chiplet, routing the first packet to the second chiplet; receiving, by the router, a third packet from a third chiplet coupled to the router via the chiplet network, the third packet being addressed to the second chiplet; based on the first packet being addressed to the second chiplet and having the first sequence indicator set, delaying transmission of the third packet to the second chiplet; receiving, by the router, the second packet; based on the second packet being addressed to the second chiplet, routing the second packet to the second chiplet; and after routing the second packet to the second chiplet, based on the second packet having the second sequence indicator cleared, routing the third packet to the second chiplet.

In Example 12, the subject matter of Example 11 includes, wherein: the delaying of the transmission of the third packet to the second chiplet is further based on a virtual channel of the first packet being the same as a virtual channel of the third packet.

In Example 13, the subject matter of Examples 11-12 includes, wherein: the routing of the third packet to the second chiplet after routing the second packet to the second chiplet is further based on a virtual channel of the second packet being the same as a virtual channel of the third packet.

In Example 14, the subject matter of Examples 11-13 includes, receiving, by the router, a fourth packet from a fourth chiplet coupled to the router via the chiplet network, the fourth packet being addressed to the second chiplet; and based on a virtual channel of the first packet being different than a virtual channel of the fourth packet, routing the fourth packet to the second chiplet.

In Example 15, the subject matter of Examples 10-14 includes, receiving, by the second chiplet, the multiple smaller packets; based on the first packet having the first sequence indicator set, buffering the first packet; and based on the second packet having the second sequence indicator cleared, combining the multiple smaller packets to recreate a payload of the data packet.

In Example 16, the subject matter of Examples 10-15 includes, wherein: the transmitting of the first packet with the first sequence indicator set is part of: determining that each packet of a set of packets of the multiple smaller packets is not the last packet of the multiple smaller packets; and transmitting each packet of the set of packets with a sequence indicator set; and the transmitting of the second packet with the second sequence indicator cleared is based on a determination that the second packet is the last packet of the multiple smaller packets.

Example 17 is a non-transitory machine-readable medium that stores instructions that, when executed by a first chiplet coupled to a router via a chiplet network, cause the first chiplet to perform operations comprising: determining, based on a predetermined threshold and a size of a data packet that is addressed to a second chiplet coupled to the router via the chiplet network, to split the large packet; generating, from the large packet, multiple smaller packets each comprising fewer bits than the data packet; transmitting, over the chiplet network, a first packet of the multiple smaller packets with a first sequence indicator set, the first packet being addressed to the second chiplet; and transmitting, over the chiplet network, a second packet of the multiple smaller packets with a second sequence indicator cleared, the second packet being addressed to the second chiplet.

In Example 18, the subject matter of Example 17 includes, wherein: the transmitting of the first packet with the first sequence indicator set is part of: determining that each packet of a set of packets of the multiple smaller packets is not the last packet of the multiple smaller packets; and transmitting each packet of the set of packets with a sequence indicator set; and the transmitting of the second packet with the second sequence indicator cleared is based on a determination that the second packet is the last packet of the multiple smaller packets.

In Example 19, the subject matter of Examples 17-18 includes, wherein: the second chiplet is a memory controller chiplet.

In Example 20, the subject matter of Example 19 includes, wherein: the memory controller chiplet communicates with at least one memory device chiplet through a memory interface.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A system comprising:
a transmitter at a first chiplet;
a router coupled to the transmitter via a chiplet network; and
a receiver at a second chiplet coupled to the router via the chiplet network, wherein:
the first chiplet performs operations comprising:
determining, based on a predetermined threshold and a size of a data packet that is addressed to the second chiplet, to split the data packet;
generating, from the data packet, multiple smaller packets each comprising fewer bits than the data packet;
transmitting a first packet of the multiple smaller packets with a first sequence indicator set, the first packet being addressed to the second chiplet; and
transmitting a second packet of the multiple smaller packets with a second sequence indicator cleared, the second packet being addressed to the second chiplet; and
the router performs operations comprising:
receiving the first packet, the second packet, and a third packet, the third packet received from a third chiplet via the chiplet network and the third packet addressed to the second chiplet;
based on the first packet being addressed to the second chiplet and having the first sequence indicator set, delaying transmission of the third packet to the second chiplet; and
routing the third packet to the second chiplet after routing the second packet to the second chiplet.

2. The system of claim 1, wherein the router is configured to perform operations comprising:
based on the first packet being addressed to the second chiplet, routing the first packet to the second chiplet; and
based on the second packet being addressed to the second chiplet, routing the second packet to the second chiplet;
wherein the routing of the third packet to the second chiplet after routing the second packet to the second chiplet is based on the second packet having the second sequence indicator cleared.

3. The system of claim 1, wherein:
the delaying of the transmission of the third packet to the second chiplet is further based on a virtual channel of the first packet being the same as a virtual channel of the third packet.

4. The system of claim 2, wherein:
the routing of the third packet to the second chiplet after routing the second packet to the second chiplet is further based on a virtual channel of the second packet being the same as a virtual channel of the third packet.

5. The system of claim 1, wherein the router further performs operations comprising:
receiving a fourth packet from a fourth chiplet coupled to the router via the chiplet network, the fourth packet being addressed to the second chiplet; and
based on a virtual channel of the first packet being different than a virtual channel of the fourth packet, routing the fourth packet to the second chiplet.

6. The system of claim 1, wherein the second chiplet performs operations comprising:
receiving the multiple smaller packets;
based on the first packet having the first sequence indicator set, buffering the first packet; and
based on the second packet having the second sequence indicator cleared, combining the multiple smaller packets to recreate a payload of the data packet.

7. The system of claim 1, wherein:
the transmitting of the first packet with the first sequence indicator set is part of:
determining that each packet of a set of packets of the multiple smaller packets is not the last packet of the multiple smaller packets; and
transmitting each packet of the set of packets with a sequence indicator set; and
the transmitting of the second packet with the second sequence indicator cleared is based on a determination that the second packet is the last packet of the multiple smaller packets.

8. The system of claim 1, wherein:
the second chiplet is a memory controller chiplet.

9. The system of claim 8, wherein:
the memory controller chiplet communicates with at least one memory device chiplet through a memory interface.

10. A method comprising:
determining, by a first chiplet coupled to a router via a chiplet network, based on a predetermined threshold and a size of a data packet that is addressed to a second chiplet coupled to the router via the chiplet network, to split the data packet;
generating, by the first chiplet and from the data packet, multiple smaller packets each comprising fewer bits than the data packet;
transmitting, by the first chiplet and over the chiplet network, a first packet of the multiple smaller packets with a first sequence indicator set, the first packet being addressed to the second chiplet;
transmitting, by the first chiplet and over the chiplet network, a second packet of the multiple smaller packets with a second sequence indicator cleared, the second packet being addressed to the second chiplet;
receiving, by the router, the first packet, the second packet, and a third packet from a third chiplet coupled to the router via the chiplet network, the third packet being addressed to the second chiplet;
based on the first packet being addressed to the second chiplet and having the first sequence indicator set, delaying transmission of the third packet to the second chiplet; and
routing the third packet to the second chiplet after routing the second packet to the second chiplet.

11. The method of claim 10, further comprising:
based on the first packet being addressed to the second chiplet, routing the first packet to the second chiplet; and
based on the second packet being addressed to the second chiplet, routing the second packet to the second chiplet;
wherein the routing of the third packet to the second chiplet after routing the second packet to the second chiplet is based on the second packet having the second sequence indicator cleared.

12. The method of claim 10, wherein:
the delaying of the transmission of the third packet to the second chiplet is further based on a virtual channel of the first packet being the same as a virtual channel of the third packet.

13. The method of claim 11, wherein:
the routing of the third packet to the second chiplet after routing the second packet to the second chiplet is further based on a virtual channel of the second packet being the same as a virtual channel of the third packet.

14. The method of claim 10, further comprising:
receiving, by the router, a fourth packet from a fourth chiplet coupled to the router via the chiplet network, the fourth packet being addressed to the second chiplet; and
based on a virtual channel of the first packet being different than a virtual channel of the fourth packet, routing the fourth packet to the second chiplet.

15. The method of claim 10, further comprising:
receiving, by the second chiplet, the multiple smaller packets;
based on the first packet having the first sequence indicator set, buffering the first packet; and
based on the second packet having the second sequence indicator cleared, combining the multiple smaller packets to recreate a payload of the data packet.

16. The method of claim 10, wherein:
the transmitting of the first packet with the first sequence indicator set is part of:
determining that each packet of a set of packets of the multiple smaller packets is not the last packet of the multiple smaller packets; and
transmitting each packet of the set of packets with a sequence indicator set; and
the transmitting of the second packet with the second sequence indicator cleared is based on a determination that the second packet is the last packet of the multiple smaller packets.

17. A non-transitory machine-readable medium that stores instructions that, when executed by a router coupled to a first chiplet, a second chiplet, and a third chiplet via a chiplet network, cause the router to perform operations comprising:
receiving a first packet from the first chiplet, the first packet being addressed to the second chiplet;
based on the first packet being addressed to the second chiplet, routing the first packet to the second chiplet;
receiving a third packet from the third chiplet, the third packet being addressed to the second chiplet;
based on the first packet being addressed to the second chiplet and having a first sequence indicator set, delaying transmission of the third packet to the second chiplet;
receiving a second packet from the first chiplet, the second packet being addressed to the second chiplet, the second packet having a second sequence indicator cleared;
based on the second packet being addressed to the second chiplet, routing the second packet to the second chiplet; and
after routing the second packet to the second chiplet, based on the second packet having the second sequence indicator cleared, routing the third packet to the second chiplet.

18. The non-transitory machine-readable medium of claim 17, wherein:
the second chiplet is a memory controller chiplet.

19. The non-transitory machine-readable medium of claim 18, wherein:
the memory controller chiplet communicates with at least one memory device chiplet through a memory interface.

20. The non-transitory machine-readable medium of claim 17, wherein:
the delaying of the transmission of the third packet to the second chiplet is further based on a virtual channel of the first packet being the same as a virtual channel of the third packet.

* * * * *